United States Patent [19]

Bastasch et al.

[11] Patent Number: 5,485,772
[45] Date of Patent: Jan. 23, 1996

[54] BUN SLICING MACHINE

[75] Inventors: Paul M. Bastasch, Overland Park, Kans.; Randyl C. Hanson, Lake Lotawana; Laclede L. Hill, Kansas City, both of Mo.; William E. Norton, Edwardsville, Kans.; Hans W. Schoenbuchner, Conygham, Pa.

[73] Assignee: United Bakery Equipment Company, Lenexa, Kans.

[21] Appl. No.: 200,435

[22] Filed: Feb. 23, 1994

[51] Int. Cl.[6] ..................................................... B26D 3/08
[52] U.S. Cl. ........................... 83/873; 83/874; 83/420; 83/449; 83/563; 83/932; 225/93
[58] Field of Search .......................... 83/873, 874, 871, 83/872, 418, 420, 446, 449, 563, 932; 225/93, 97

[56] References Cited

U.S. PATENT DOCUMENTS

| | | | |
|---|---|---|---|
| 2,669,269 | 2/1954 | Schmidt | 83/873 |
| 3,112,780 | 12/1963 | Lecrone | 83/873 |
| 3,459,088 | 8/1969 | Brunson et al. | 83/563 X |
| 3,911,769 | 10/1975 | Lecrone | 83/873 |
| 3,972,255 | 8/1976 | Irving, Jr. et al. | 83/873 |
| 3,995,515 | 12/1976 | White | 83/873 |
| 4,049,171 | 9/1977 | Lecrone | 83/872 X |
| 5,320,017 | 6/1994 | Lecrone | 83/874 X |

Primary Examiner—Eugenia Jones
Attorney, Agent, or Firm—Kokjer, Kircher, Bowman & Johnson

[57] ABSTRACT

A machine for slicing bakery products such as rolls and buns. Buns that are arranged in clusters having at least four buns each have their two outside buns sliced from the outer edges and the interior buns sliced from a location between them. A vertical disk with a dull edge is arranged to engage the weak line between the two interior buns to create a break from the bottom that provides access for the shaft of the slicing blade to pass through the bun cluster without disfiguring the buns. The disks and the slicing blades for the interior buns are carried on a lower slicing mechanism which underlies the conveyor system for the buns. The lower slicing mechanism can be slid out to one side of the machine for servicing. The disks can be lowered to an inoperative position by an actuating linkage, and the lower slicing blades are automatically released when the disks are lowered. An alignment device used for the slicing of individually baked buns properly locates each bun as it approaches the slicing unit so that the cuts are consistent on the different buns even if they are irregular in size and shape.

5 Claims, 5 Drawing Sheets

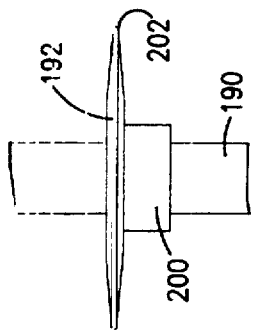
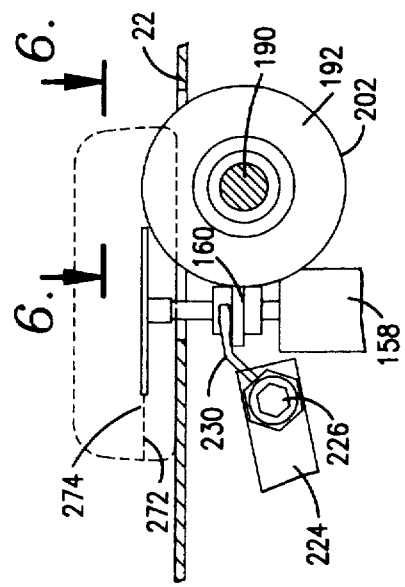
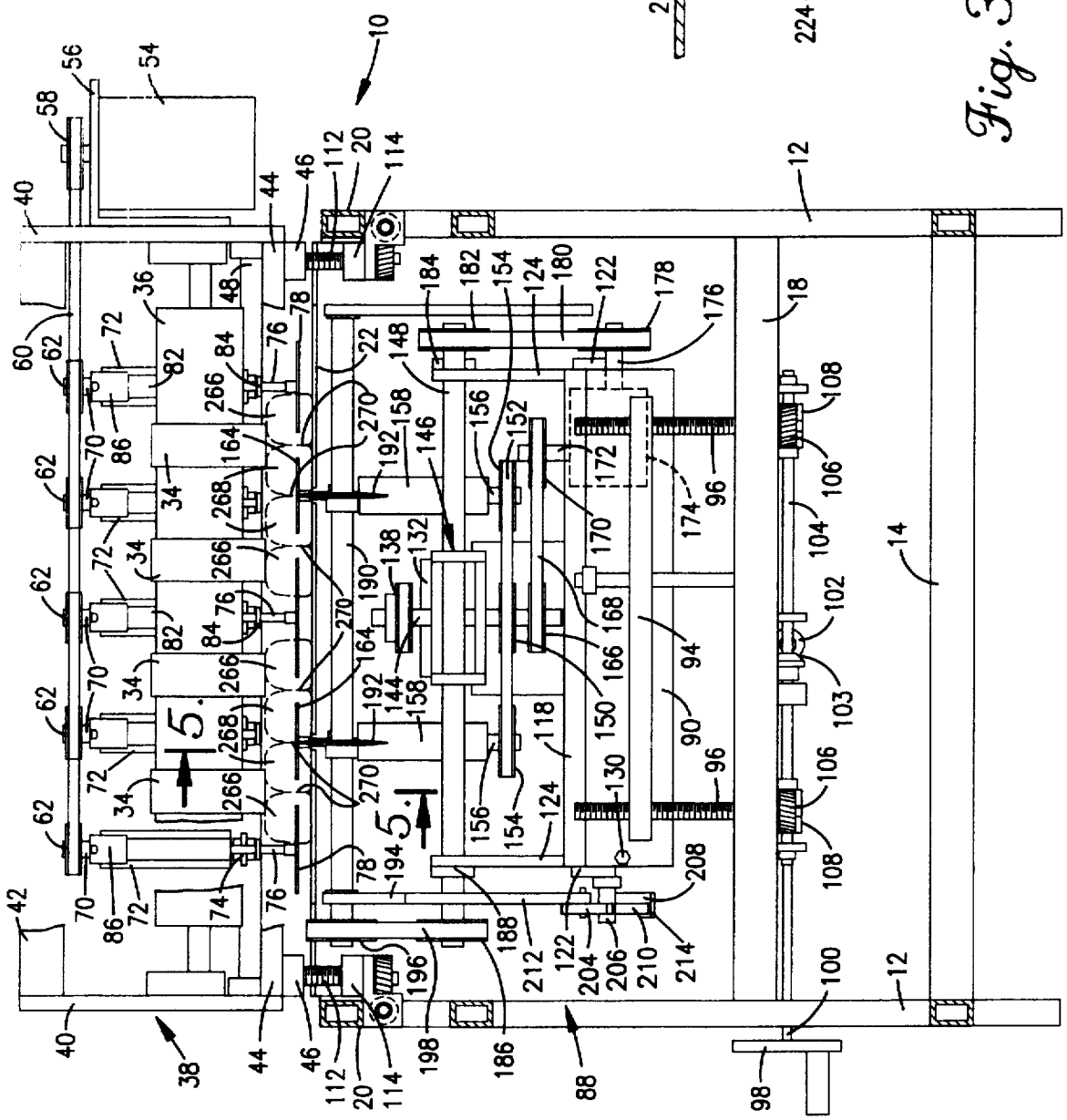

BUN SLICING MACHINE

FIELD OF THE INVENTION

This invention relates generally to automated bakery equipment and more particularly to a machine which is used for the slicing of bakery products such as buns and rolls.

BACKGROUND OF THE INVENTION

In the bakery industry, it is common for long buns to be baked in clusters each of which includes four to six buns. Four to six individual "fingers" of dough are initially placed in a baking pan. During the baking process, the dough expands such that the buns bake together and are joined at areas that are relatively weak defined along the lines where the buns are joined during the baking process. The buns are subsequently sliced and are packaged together in packages containing one or more clusters.

The slices are normally hinge cuts which present little difficulty for the two outside buns in each cluster. The outer side edges of these buns are exposed and can be sliced from the outside. However, the interior buns in each cluster are joined at both edges to two other buns, so access to their edges in order to slice them is a much more difficult undertaking. In order to avoid conspicuous and unsightly cut lines, it is necessary to enter the bun clusters from the bottom which is generally not visible in the final package. A vertical blade can be used to make a vertical slit from the bottom part way through the weakened area between the two interior buns in each cluster, and a horizontal slicing blade can then be used to make horizontal hinge cuts in both interior buns, with the vertical slit providing room for accommodating the shaft of the horizontal slicing blade.

One problem with this technique is that the vertical blade slits the buns at the exact location where it comes into contact with them. Due to inherent variations in the buns from cluster to cluster, the vertical blade may make a slit at a location that is slightly offset from the weakened line where the buns are joined. As a consequence, the horizontal slices may not start at the edge of each bun, and the bun slicing operation may not be consistent from cluster to cluster. In addition, the dough in the area between the natural weak line and the location of the vertical slit may fall from the bun. This detracts from the integrity of the bun clusters and creates crumbs that can clog the machinery and increase the cleaning and maintenance requirements.

Another type of problem is encountered when it is necessary to handle individually baked rolls or buns that are irregular or inconsistent in their shapes and sizes. Irregular buns and rolls are deemed by many commercial bakers to be desirable because there is a perception that irregular products are more appealing to customers as having a hand formed or home made appearance. When the buns are lacking in uniformity in size and shape, they are difficult to handle with automated equipment. Achieving a consistent hinge type cut is particularly difficult because the products approach the slicing mechanism in different postures as a result of their dissimilar configurations. Some products may be sliced completely through and others may be sliced only across a corner or in some other inadequate fashion.

SUMMARY OF THE INVENTION

The present invention is directed to automated machinery for the slicing of baked goods in a manner that is improved compared to what has been available in the past. In one mode of operation, the machine is useful for the slicing of clustered buns. It has been found that the use of a vertical disk having a dull periphery for engaging the weak area between the two interior buns of a cluster overcomes the problems associated with using a sharp-edged blade. A dull disk causes a break along the weakened line between the buns even if it engages them at a location slightly displaced from the weak area. Rather than slitting the bun clusters in the manner of a sharp blade, a dull disk applies a blunt force which breaks the crust and effects a break along the weakened line where the buns have baked together. Because the disk does not use slitting or cutting action, the break occurs along the weak line because that is the weakest area where the buns are most prone to break. Consequently, the disk can engage the buns at a location offset from the weakened line and still create a break that extends along the weakened line.

The invention is further characterized by a lower slicing mechanism that can be slid as a unit out the side of the base machine for cleaning or other servicing. Because of its location beneath the conveyor path for the buns, the lower slicing unit tends to quickly accumulate crumbs and other materials which must be removed periodically. Access is restricted to the area beneath the conveyor because of its location, and maintenance in this area has been particularly difficult in the past. The machine of the present invention has a lower slicing mechanism that can be released by removing the drive belt from the motor and releasing a locking screw so that the slicing mechanism can be slid out to the side for disk maintenance or cleaning operations. The upper slicing mechanism can continue to operate while the lower unit is being serviced.

Another feature of the machine of the present invention is that the bottom disks can be lowered below the conveyor by operating a hand lever. The bottom slicing blades are automatically released at the same time. With the operating components of the lower unit thus withdrawn, the upper mechanism can operate to form hinge cuts, butterfly cuts, slab cuts or other types of cuts to individual bakery products which do not require the operations provided by the lower slicing unit.

In another aspect of the invention, an alignment mechanism is provided to more consistently slice individually baked products that are irregular in size and/or shape. The buns travel down lanes which have guide surfaces on their opposite sides and are wide enough to accommodate a pair of buns side by side. The alignment mechanism includes a pair of vanes for each lane. The vanes in each pair are reciprocated outwardly away from one another in order to push the buns in each pair against the opposite guide surfaces when they are conveyed past the alignment device. The vanes are then returned inwardly to their home positions. Pressing of the buns against the guide surfaces locates them properly so that when they subsequently reach the slicing blade, they are all sliced uniformly despite their non-uniform size and shape.

DESCRIPTION OF THE DRAWINGS

In the accompanying drawings which form a part of the specification and are to be read in conjunction therewith and in which like reference numerals are used to indicate like parts in the various views:

FIG. 3 is a fragmentary sectional view on an enlarged scale taken generally along line 3—3 of FIG. 1 in the direction of the arrows;

FIG. 5 is a fragmentary sectional view on an enlarged scale taken generally along line 5—5 of FIG. 3 in the direction of the arrows;

FIG. 6 is a fragmentary view taken generally along line 6—6 of FIG. 5 in the direction of the arrow showing one of the rotary disks of the machine;

DETAILED DESCRIPTION OF THE INVENTION

Figure 1:
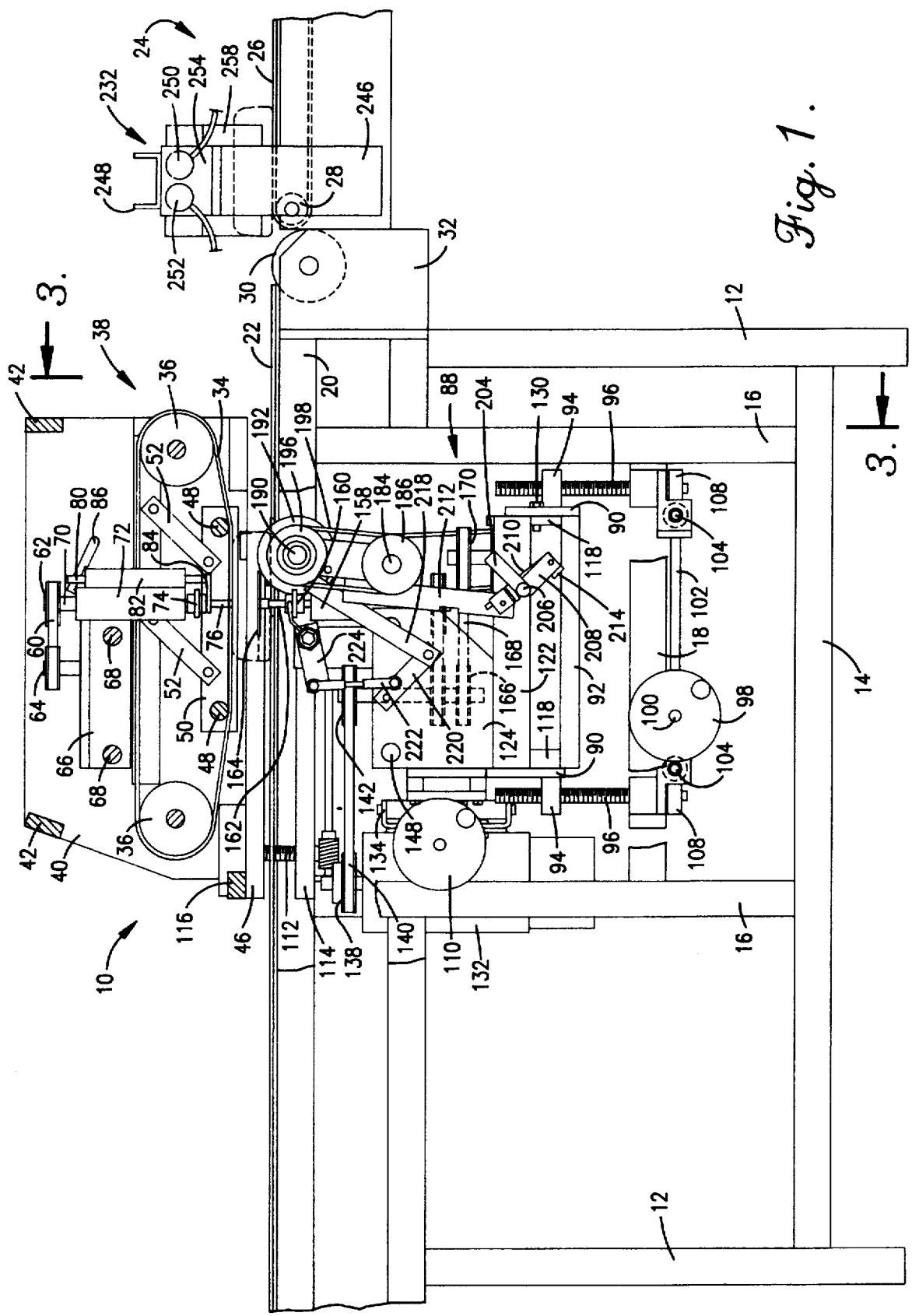
FIG. 1 is a fragmentary side elevational view of a bakery product slicing machine constructed according to a preferred embodiment of the present invention, with the lower cutting mechanism shown in its operating position and with portions broken away for purposes of illustration.

Referring now to the drawings in more detail and initially to FIG. 1, numeral 10 generally designates a machine which is used to slice bakery products such as baked rolls and buns. The machine 10 has a rigid frame which includes a plurality of legs 12 which support the machine on a floor or other surface. Horizontal braces 14 extend between the legs 12 near their lower ends. A pair of upright members 16 extend upwardly from the brace 14 on each side of the machine. Each pair of uprights 16 is connected by a horizontal brace 18 located near the lower ends of the uprights. The legs 12 and uprights 16 support on their upper ends horizontal side members 20. A horizontal panel 22 is supported between the opposite side members 20 and provides a conveyor surface along which the buns and rolls are conveyed, as will be explained more fully.

The buns and rolls are delivered onto the panel 22 from an infeed conveyor which is generally identified by numeral 24. The infeed conveyor 24 receives the baked products and conveys them toward the panel 22 along a belt 26. The belt 26 is drawn around rollers such as the roller 28 and is driven by a conventional motor (not shown). The products which are conveyed on the belt 26 are handled by a suitable indexer (not shown) such that the products are released in groups arranged across the belt 26.

The conveyor belt 26 is at substantially the same height as the panel 22. Between the end of the belt 26 and the end of the panel 22, a large roller 20 extends across the machine. The roller 30 is supported for rotation between plates 32 mounted on the opposite sides of the frame. The roller 30 accommodates passage of the bakery products from the belt 26 onto the panel 22.

The bakery products which are delivered onto the panel 22 are transported along the panel by a conveyor which includes a plurality of belts 34 drawn around a pair of rollers 36. The conveyor is mounted on an upper slicing unit which is generally identified by numeral 38 and which is located above the panel 22. With additional reference to FIG. 3, the rollers 36 are mounted for rotation between opposite side panels 40 of the upper slicing mechanism. Cross bars 42 extend between the sides 40. The lower edge portion of each side panel 40 is provided with a plate 44. The plates 44 rest on top of underlying bars 46 which are mounted for adjustment up and down, as will be explained more fully.

The bottom run of each conveyor belt 34 is spaced above the panel 22 by a distance slightly less than the height of the bakery products that are being handled by the machine. Consequently, when the befits 34 are driven, they engage the tops of the bakery products and convey them in a direction from right to left as viewed in FIGS. 1 and 2. The lower runs of the belts 34 can be adjusted up and down by adjusting a pair of rollers 48 up and down. The rollers 48 extend between a pair of plates 50. The plates 50 are carried on the lower ends of parallel links 52 which can be pivoted up and down to raise and lower the rollers 48, thus adjusting the elevation of the lower run of each belt 34.

A motor 54 (see FIGS. 3 and 4) is mounted on a bracket 56 secured to one of the side panels 40 of the upper slicing mechanism. The motor 54 drives an output pulley 58 which receives a drive belt 60. The belt 60 is drawn around a plurality of driven pulleys 62 and also around a plurality of idler pulleys 64 (see FIG. 1). Each of the idler pulleys 64 is mounted for rotation on top of a bracket 66. The brackets 66 are mounted on rods 68 which extend horizontally across the upper slicing mechanism 38 between the side panels 40.

The driven pulleys 62 are mounted on the top ends of shafts 70 which extend through and are supported for rotation by cylinders 72 secured to the brackets 66. The brackets 66 are adjustable along the rods 68 in order to provide adjustability of the locations of the shafts 70 across the width of the machine.

Each of the shafts 70 drives a chuck 74 which is located below the corresponding cylinder 72. Each of the chucks 74 receives a vertical shaft 76 which carries a circular slicing disk 78 on its lower end. The blades 78 are oriented in a horizontal plane and serve to slice buns and rolls, as will be explained more fully.

Each of the chucks 74 is urged downwardly or away from the cylindrical body 72 which holds it. The chuck 74 normally clamps the shaft 76 securely in it. However, when the chuck 74 is pushed upwardly or toward its cylindrical body 72, it releases the blade 78. Associated with each of the bodies 72 is a vertical actuator rod 80 which extends slidably through a block 82 located adjacent to the cylinder 72. The lower end of each actuator rod 80 carries a projecting tab 84 which is located adjacent to the bottom of the chuck 74. The top end of each rod 80 is equipped with a hand lever 86. The downward bias on each chuck 74 normally maintains the parts in the position shown in FIG. 2. However, if the lever 86 is pivoted upwardly, it pulls rod 80 upwardly and thus raises the tab 84 and lifts the chuck 74 to its release position. Then, the shaft 76 can be removed from the chuck and replaced by a different shaft carrying a different size or type of slicing blade.

The machine 10 is equipped with a lower slicing mechanism which is generally identified by numeral 88. The lower slicing mechanism is supported to slide sidewardly in and out on a frame which includes a pair of end panels 90 and bars 92 which connect the panels 90. Each of the panels 90 has an outwardly projecting bar 94. Each of the bars 94 cooperates with a pair of threaded shafts 96 to permit up and down adjustment of the frame which holds the lower slicing mechanism 88.

A hand wheel 98 located on one side of the frame turns a shaft 100 which mates with and drives a perpendicular shaft 102 through miter gearing 103. The shaft 102 is connected by miter gearing with a pair of shafts 104 each extending generally across the width of the machine and each carrying a pair of worm gears 106. The worm gears 106 drive spur gears 108 which are mounted on the lower ends of the threaded shafts 96. The shafts 96 are threaded into internally threaded openings formed through the bars 94. The wheel 98 can be turned to rotate all of the shafts 96 in one direction, thus raising or lowering the entire frame for the lower cutting mechanism depending upon the direction of rotation of the hand wheel 98.

The upper slicing mechanism 38 can be adjusted up and down in a similar fashion. A hand wheel 110 (see FIG. 1) located on the same side of the frame as the other hand wheel 98 is connected through suitable gearing with four threaded shafts 112. The shafts 112 are supported for rotation on bars 114 secured to the frame member 20, and the upper ends of the shafts are received in threaded openings formed in the bars 46. Thus, turning of the hand wheel 110 raises and lowers the bars 46 and the upper cutting mechanism 38 which rests on the bars 46. The bars 44 and 46 are preferably hinged together at one end to provide a horizontal hinge axis 116 about which the upper slicing mechanism 38 may be raised and lowered to facilitate access for changing of the blades 78 and for other maintenance and servicing operations.

Figure 4:
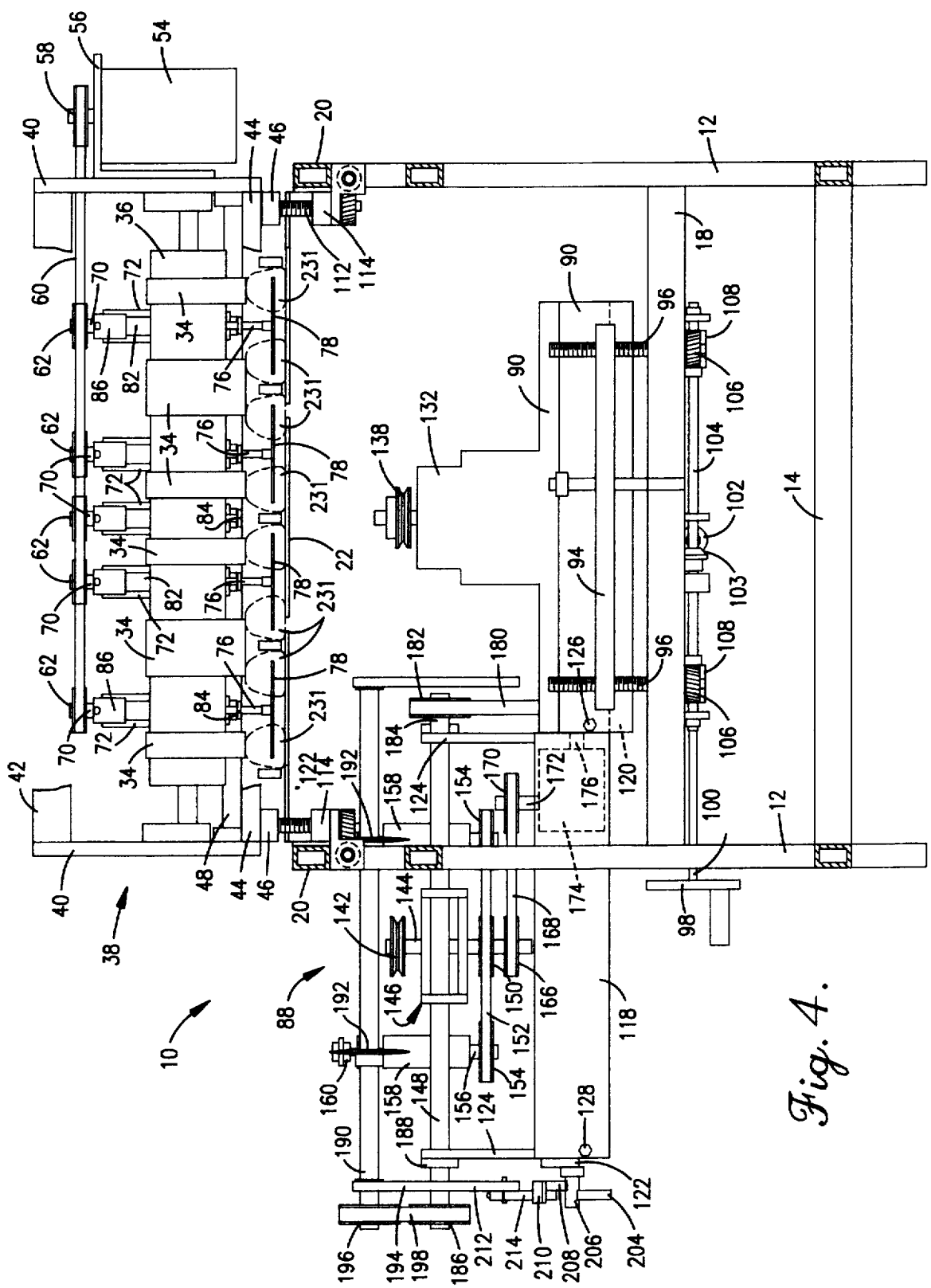
FIG. 4 is a fragmentary sectional view on an enlarged scale taken generally along line 4—4 of FIG. 2 in the direction of the arrows and showing the lower slicing mechanism slid out the side of the machine where it can be conveniently serviced.

The lower cutting mechanism 88 includes a pair of panels 118 which rest at their lower edges on rails 120 (see FIG. 4) which project inwardly from the frame panels 90. The panels 118 are connected at their opposite ends by rigid bars 122. Opposite side plates 124 are secured to the bars 122 and extend generally upwardly from them. As shown in FIG. 4, the frame panel 90 is provided with an opening 126, and the corresponding panel 118 of the lower slicing mechanism 88 is provided with a threaded opening 128. When the slicing mechanism 88 is in place in its operating condition, the holes align with one another, and a locking screw 130 can be inserted through opening 126 and threaded into opening 128 to secure the slicing mechanism 88 in place.

A motor 132 is mounted on a pivot bracket 134 which is secured to one of the frame panels 90. The pivot bracket 134 allows the motor 132 to pivot about a vertical axis, and adjustment screws 136 are provided to set the pivotal position of the motor.

The motor 132 drives an output pulley 138. A drive belt 140 is drawn around pulley 138 and around another pulley 142 mounted on top of a vertical shaft 144. The shaft 144 is supported by a bracket 146 (see FIGS. 3 and 4). The bracket 146 is mounted on a pair of horizontal rods 148 which extend between the side plates 124 of the slicing mechanism.

Below bracket 146, the shaft 144 carries a pulley 150 which receives a belt 152. The belt 152 is drawn around a pair of pulleys 154 which are carried on the lower ends of shafts 156. The shafts 156 are supported for rotation by cylinders 158 and drive chucks 160 located above the cylinders.

Each chuck 160 is urged upwardly or in a direction away from the cylinder 158. In its normal extended position, each chuck 160 clamps a vertical shaft 162 which carries a slicing blade 164 on its top end. The slicing blades 164 are spaced apart from one another transversely of the machine 10, and the shafts 162 extend upwardly through slits in the panel 22. The blades 164 are located in the same horizontal plane as the upper slicing blades 78, as best shown in FIG. 3.

The lower end of shaft 144 carries a second pulley 166. A belt 168 is drawn around pulley 166 and around another pulley 170 carried on a shaft 172. Shaft 172 extends into a bevel gear box 174 which contains mating bevel gears and which has a horizontal output shaft 176. The output shaft 176 carries a pulley 178. A belt 180 is drawn around pulley 178 and around another pulley 182. A horizontal shaft 184 carries pulley 182 on one end and another pulley 186 on the opposite end. The shaft 184 is supported for rotation by a bracket 188 which is secured to the side plates 124.

Located generally above and parallel to shaft 184 is another shaft 190 which carries a pair of spaced apart disks 192. Shaft 190 is supported for rotation on the top end of a bracket 194 having its lower end received on shaft 184 in a manner allowing the bracket to pivot about the axis of shaft 184. A pulley 196 is secured to one end of shaft 190 and receives a belt 198 which is drawn around pulleys 186 and 196 to rotate the upper shaft 190.

As best shown in FIG. 6, each of the disks 192 has a collar 200 which is secured to the shaft 190. It is an important feature of the invention that the circular peripheral edge of each of the disks 192 is a blunt edge 202 rather than a sharpened edge of the type that would cut through the rolls or buns that are handled by the machine.

The shaft 190 is raised and lowered by a linkage which pivots the bracket 194 about the axis of shaft 184. The linkage includes a handle 204 which is secured to and extends outwardly from a horizontal shaft 206 which is supported to pivot on the plates 122. A pivot link 208 also projects outwardly from shaft 206 and is pivoted at its opposite end to one end of another link 210. Link 210 is in turn pivoted at its opposite end to an arm 212 which is rigidly secured at its upper end with the bracket 194.

Figure 2:
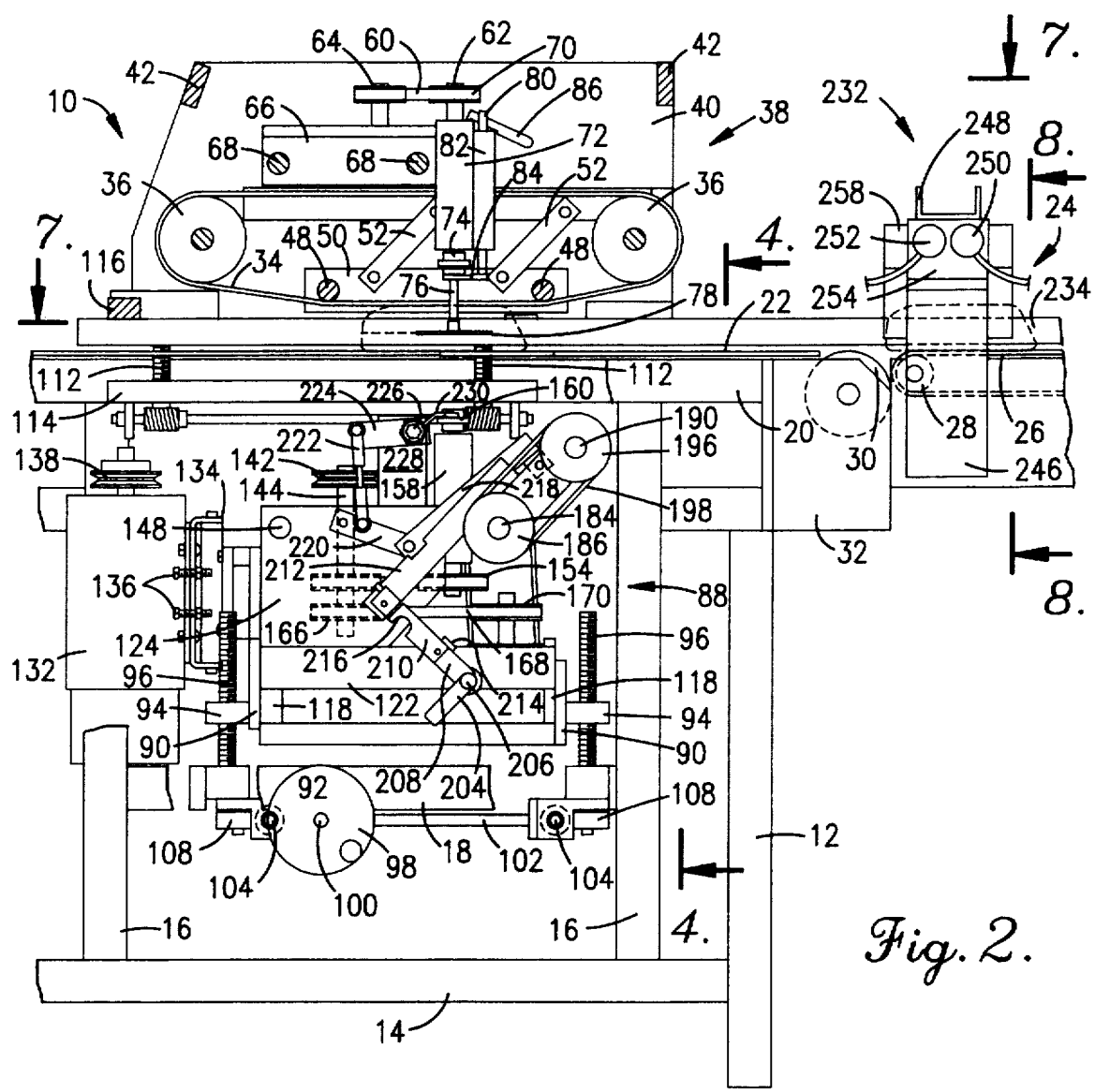
FIG. 2 is a fragmentary side elevational view similar to FIG. 1, but showing the lower slicing mechanism lowered to its non-operating position where it may be slid out of the side of the machine frame for servicing.

When the handle 204 is turned in a counterclockwise direction from the position shown in FIG. 1, link 208 pivots in the same direction and causes link 210 and arm 212 to move toward the position of FIG. 2. When the handle 204 has been fully pivoted to the FIG. 2 position, the links 208 and 210 cooperate to form a straight arm, and the pivotal movement of the arm 212 causes the bracket 194 to pivot in a clockwise direction about the axis of shaft 184. This movement of the bracket lowers the disks 192 below the panel 22 to the position shown in FIG. 2 which is a position in which the disks are not operative to affect the baked goods which are moving along the conveyor path. The end of link 208 is provided with a projecting tab 214 which engages the edge of link 210, thus preventing the linkage from moving beyond the inoperative position shown in FIG. 2. The edge of link 210 has a circular notch 216 which fits around the shaft 206 in the operative position of the disks (the FIG. 1 position), thus limiting the movement of the linkage in the opposite direction of handle rotation.

Another linkage is provided to automatically release the slicing blades 164 of the lower slicing mechanism when the disks 192 are lowered to their inoperative position. As shown in FIGS. 1 and 2, one end of an arm 218 is pivoted to bracket 194. The opposite end of the arm 218 is pivoted to a link 220 which is pivotally connected at its opposite end to a fixed part of the lower slicing mechanism. Another link 222 is pivoted at its lower end to link 220 intermediate the two pivot connections of link 220. The top end of link 222 is pivoted to a lever 224. The opposite end of lever 224 is secured to a horizontal shaft 226 which extends between and is supported for rotation by brackets 228 of the lower slicing mechanism.

The shaft 226 carries a pair of projecting fingers 230 which contact the chucks 160 that hold the shafts 162 of the lower slicing blades 164. When the disks 192 are in their raised operating position, the chucks 160 extend outwardly from their cylindrical bodies 158, and the shafts 162 are then clamped in the chucks 160. However, when the disks 192 are lowered to their inoperative position (FIG. 2) by actuating the linkage for the disks, the pivotal movement of the bracket 194 pulls arm 218 in a direction causing link 222 to move upwardly. This pivots lever 224 in a clockwise direction as viewed in FIGS. 1 and 2, and the shaft 226 then turns to lower the fingers 230 which press the chucks 160 downwardly. This movement of the chucks 160 releases the shafts 162 so that the blades 164 can be removed.

Figure 7:
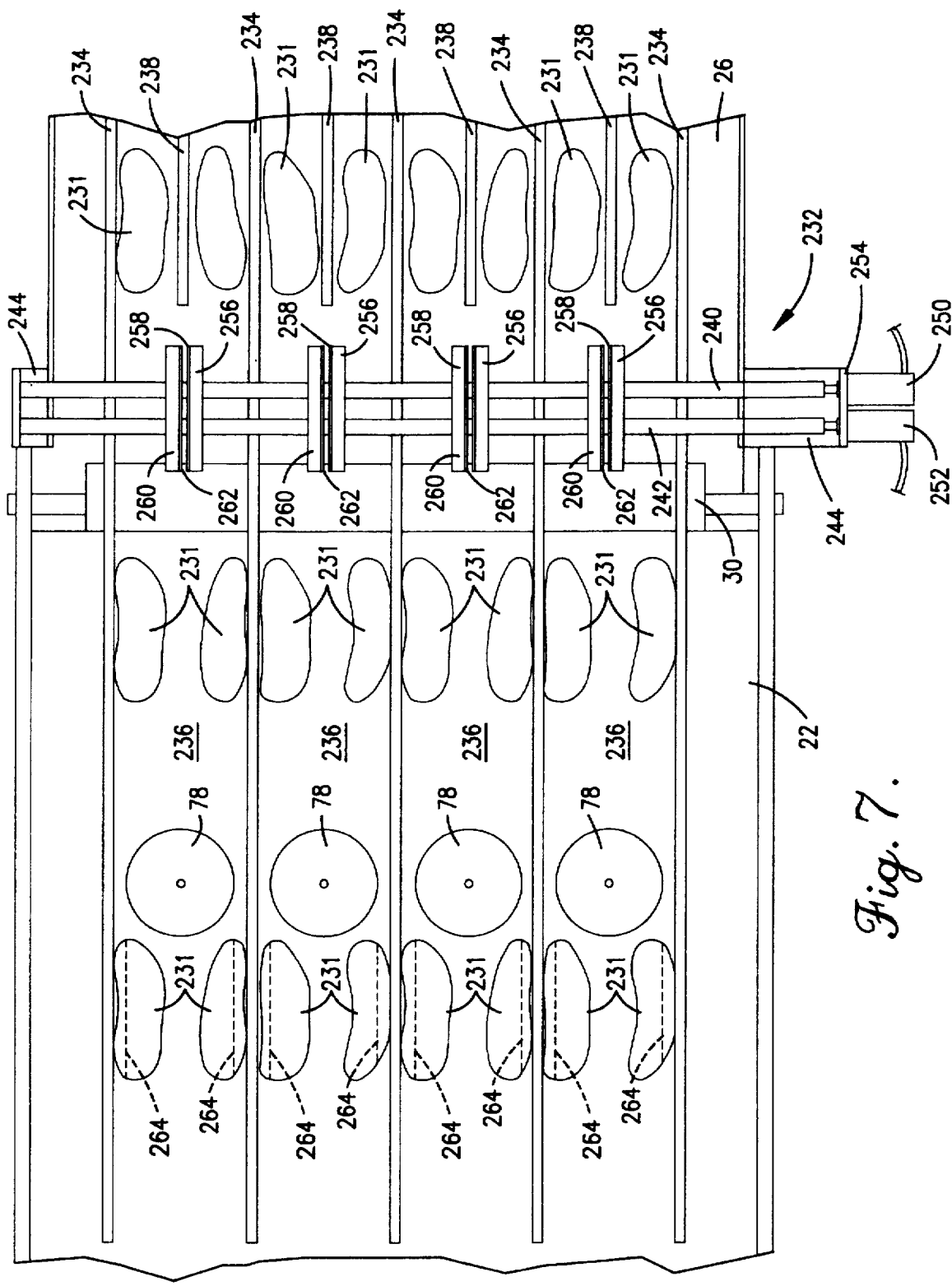
FIG. 7 is a fragmentary top plan view taken generally along line 7—7 of FIG. 2 in the direction of the arrows and showing the alignment device for use in the slicing of individually baked rolls.

The machine 10 is useful to slice a variety of different types of baked products, including individually baked rolls or buns 231 of the type best shown in FIG. 7. The buns 231 are nonuniform and irregular and differ in their sizes and shapes to exhibit a hand formed or home made appearance. This type of bun is perceived by many commercial bakers as being more desirable than uniform buns because consumers perceive hand formed buns as being tastier and generally superior. The buns 231 are considerably longer than they are wide and have curved surfaces of irregular shape.

When the machine 10 is used to slice individually baked buns such as the buns 231, an alignment device which is generally designated by numeral 232 may be used. Longitudinal guides 234 extend along the upper surface of the infeed conveyor belt 26 and also along the top surface of panel 22 at least to a location past the upper slicing blades 78. The guides 234 divide the conveyor system into side by side Lanes 236, each of which is wide enough to accommodate two of the buns 231 located side by side. On the infeed conveyor 24, each lane 236 is divided in half by a partition 238 located midway between the guides 234 on opposite sides of the lane. The partitions 238 terminate near the discharge end of the infeed conveyor belt 26. The slicing blades 78 are centered on the lanes 236 and are located at a height approximately half that of each bun 230.

Figure 8:
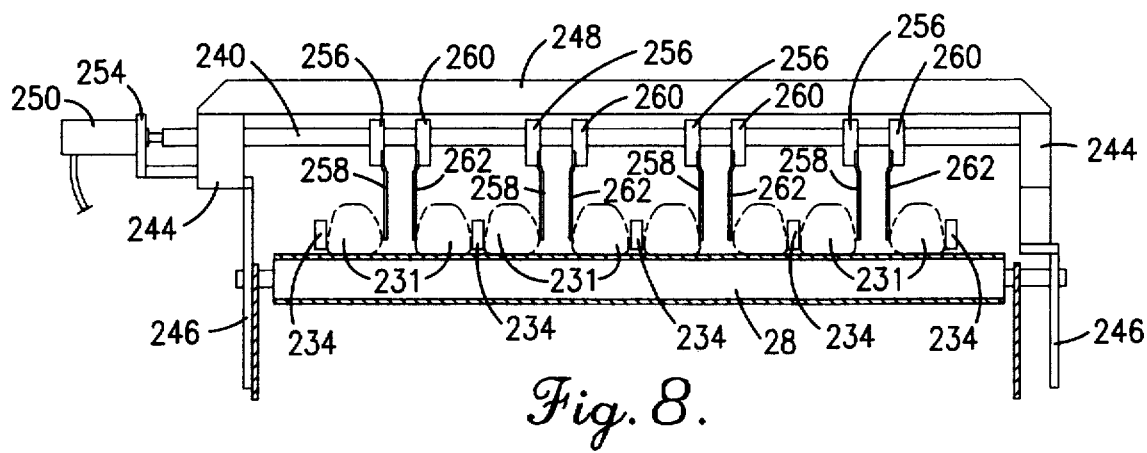
FIG. 8 is a fragmentary sectional view taken generally along line 8—8 of FIG. 2 in the direction of the arrows and showing the alignment device for individually baked rolls.

The alignment device 232 is located adjacent to the discharge end of the infeed conveyor 24. The alignment device 232 includes a pair of parallel actuator rods 240 and 242 which extend transversely across the machine between brackets 244 located on opposite sides of the machine. The rods 240 and 242 are located well above the belt 26, and are parallel to one another a short distance apart. The brackets 244 are secured on mounting plates 246 (see FIG. 8) which are suitably attached to the frame of the infeed conveyor 24. The brackets 244 are connected by a cross brace 248 which extends between the brackets at a location above the rods 240 and 242.

The actuator rods 240 and 242 are connected with the piston rods of respective pneumatic cylinders 250 and 252. The cylinders 250 and 252 are mounted on a bracket plate 254 which is secured to the bracket 244 on one side of the machine.

A mounting plate 256 is secured to rod 240 at a location centered generally above each of the underlying lanes 236. Each of the mounting plates 256 is slidably fit on the other rod 242. Extending downwardly from each of the mounting plates 256 is a thin paddle or vane 258. The vanes 258 are flat members constructed of spring steel which provides a cushioned spring type force. The lower edge of each plate 258 is located slightly above the surface of the underlying conveyor belt 26.

The other rod 242 carries a plurality of mounting plates 260 which fit slidably around rod 240. The plates 260 are similar to plates 256 and are located above the center area of each lane 236. Mounted on each of the plates 260 is a paddle or vane 262. The vanes 262 are similar to vanes 258, and the vanes 258 and 262 are arranged in pairs, with one pair of vanes being located at the center of each lane 236 immediately beyond the end of the center partition 238 of the lane.

In operation, the machine 10 can be used for the slicing of individually baked products such as the irregular buns 231. In this application, the lower slicing mechanism 88 is not used, and the linkage is activated to lower the disks 192 to their inoperative position. The slicing disks 78 of the upper slicing mechanism 38 are arranged and located such that one of the disks 78 is centered in each lane 236 at the desired height for the cut.

The buns 231 are released by the indexing mechanism in rows extending transversely across the infeed conveyor 24, with two of the buns located generally side by side in each lane 236 on opposite sides of the partition 238. The pairs of vanes 258 and 260 are normally in their home position where they are adjacent to one another at the center of each lane. When the buns 231 are conveyed to the alignment device 232, one bun in each pair is located between plate 258 and the adjacent guide 234 and the other bun in each pair is located between the other plate 262 and the adjacent guide. The alignment device 232 is activated at this time. When activated, the cylinder 250 retracts its piston rod to slide rod 240 in a direction to the left as viewed in FIG. 8, and the other cylinder 252 extends its piston rod to slide rod 242 to the right as viewed in FIG. 8. The vanes 250 and 260 in each pair are thus moved apart slightly in order to press the buns 231 against the guides 234 on the opposite sides of each lane. The pressing action of the vanes 258 and 260 takes place quickly and is a gentle pressing action. The stroke length of each cylinder 250 and 252 is adjusted in order to avoid crushing the buns, and the spring steel of which the vanes 250 and 262 are constructed provides them with enough "give" to avoid crushing of the rolls.

Cylinder 250 extends its piston rod immediately after it has been retracted, and the other cylinder 252 conversely retracts its piston rod immediately after it has been extended. This returns the vanes 258 and 260 to their home position as soon as the buns have been pressed against the guides 234. The buns 231 are discharged from the infeed conveyor 24 onto the panel 22 and are conveyed by the belts 234 past the upper slicing blades 78, as best shown in FIG. 4. Because the buns are pressed against the guides 234 by the alignment device 232, they are maintained against the guides when they reach the slicing blades 78. Each of the blades 78 makes horizontal hinge cuts 264 simultaneously through the pair of buns 231 which is conveyed past the blade. Because the edge of each blade 78 is located a predetermined distance away from the guides 234 on opposite sides of the lane 236, each cut 264 terminates the same predetermined distance from the guide 234. Maintaining the buns 231 against the guides 234 assures that the hinge cuts 264 will be made in a uniform and consistent manner in each bun in order to enhance the overall appeal of the bakery products that are subsequently packaged.

The machine 10 can also be used to make horizontal hinge cuts in buns or rolls which are baked in clusters. For example, it is common for long buns to be baked in groups of four arranged in the manner of the clusters shown in FIG. 3. Each cluster of buns includes a pair of outside buns 266 and a pair of interior buns 268. The buns 266 and 268 are joined along naturally weak lines 270 which are the areas at which the buns bake together in the baking pan.

When the clustered buns 266 and 268 are to be sliced, the alignment device 232 is pivoted out of the way and is inoperative, and the guides 234 and partitions 238 are removed from the machine. The clustered buns are indexed such that they are conveyed in groups of two which travel side by side along the infeed conveyor 24 and then along the panel 22 due to the action of the conveyor belts 34 of the upper slicing mechanism.

When the clustered buns are being sliced, the lower slicing mechanism is raised to its operative position, and the two lower cutting blades 164 are installed. The disks 192 project above panel 22 and are located a short distance upstream from the slicing disks 164 of the lower slicing mechanism. The disks 192 are positioned such that they engage each cluster of buns at a location at or near the weak line 270 between the two interior buns 268 in each cluster. The blunt edges 202 of the disks 192 contact the underside of the bun cluster and break through the crust in a manner to create a vertical break 272 (see FIG. 5 in particular) which extends upwardly along the weak line 270 to a height equal to that of the edge of the disk 192. The height of each break 272 should be substantially the same distance as the shafts 162 project into the bun clusters. The breaks 272 provide spaces for receiving the shafts 162 of blades 164. Consequently, each blade 164 can make a horizontal hinge slit 274 (FIG. 5) in each of the interior buns 268 without mutilating or otherwise unduly deforming any of the buns. The slicing blades 78 of the upper slicing mechanism slice from the outside edge of each of the outer buns 266 to form horizontal hinge cuts in the outer buns. It is noted that the upper slicing mechanism preferably has a relatively large center blade 78 which slices the outside buns 266 which are oriented toward the center of the machine in each of the bun clusters.

The fact that the edges 202 of disks 192 are blunt rather than sharp is important in achieving the proper location for each break 272. A sharp edged disk makes a slit at the exact location it engages the buns, and this location may be slightly offset from the weak line 270. By using disks having dull edges, the crust is broken at the weakened line 270, and the break continues along the weak line even if the disk is displaced slightly from the weak line. Consequently, the breaks 272 which provide access for the shafts 162 are located exactly on the weak line 270, and the slices 174 are made at the proper locations without causing the removal of undue amounts of dough from the buns.

The machine is able to handle buns that are arranged in clusters each comprising six buns. The machine is then equipped with two of the disks 192 and two blades 164 for each cluster so that the four interior buns in each cluster are properly sliced.

The access that is provided to the lower slicing unit for cleaning and maintenance operations is an important feature of the invention. To service the lower slicing unit, the disks 192 are lowered to their inoperative positions, and the blades 164 are automatically released and can be removed. The drive belt 140 can be removed from the pulleys 138 and 142, and the screw 130 can be removed to release the lower slicing mechanism 88 from the frame which holds it. The slicing unit 88 can be lowered by turning the hand wheel 98 in the proper direction. The lower slicing mechanism 88 can then be slid out the side of the machine from the position shown in FIG. 3 to the position shown in FIG. 4. The panels 118 slide along the rails 120 as the lower cutting mechanism is slid out of the machine. The slicing mechanism 88 is then easily accessible for cleaning of debris from its components and for servicing the slicing disks or other components. When the servicing of the lower slicing unit has been completed, it can be slid back into the machine, the locking screw 130 can be replaced, and the belt 140 can be stretched around pulleys 138 and 142. The upper slicing unit can operate to slice bakery products as desired while the lower unit is being serviced.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A machine for slicing buns arranged in clusters each having a bottom and a pair of outside buns and at least two interior buns connected with each other at a weakened area, said machine comprising:

a frame;

means on said frame for conveying the clusters of buns successively along a predetermined conveyor path;

outside sluicing means mounted on said frame for effecting generally horizontal slices in the outside buns of each cluster conveyed along said path;

a disk having a dull peripheral edge portion;

means for mounting said disk on the frame for rotation about a generally horizontal axis at a location beneath said path wherein each cluster conveyed past the disk is engaged by said edge portion from the bottom near said weakened area;

said mounting means including a linkage mounting said disk on the frame for movement between an operating position wherein the disk is situated to effect said break and a disengaged position wherein said disk is withdrawn below the conveyor path and does not affect the buns conveyed thereon; and an operating lever in said linkage for selectively moving the disk between the operating and disengaged positions;

means for driving said disk about said axis to effect a break along said weakened area of each cluster extending from the bottom thereof and terminating below the top of the cluster;

a slicing blade;

a shaft on which said slicing blade is mounted, said shaft being supported on the frame for rotation downstream from said disk at a location to extend into said break to situate said blade in position to effect generally horizontal slices in the interior buns of each cluster conveyed along said path;

means for rotating said shaft to rotate said slicing blade;

a drive element for holding said shaft and transmitting rotational power thereto;

releasable means for securing said shaft to the drive element; and means for automatically releasing said releasable means when the disk is moved to the disengaged position, thereby allowing said shaft to be removed from said drive element.

2. A machine as set forth in claim 1, including:

an upper slicing mechanism on the frame located above said conveyor path and carrying said outside slicing means;

a lower slicing mechanism carrying said disk and slicing blade;

means for mounting said lower slicing mechanism on the frame at a location below said conveyor path for generally horizontal sliding movement between an operating position wherein said lower slicing mechanism underlies the conveyor path and a maintenance position wherein the lower slicing mechanism projects outwardly from the frame to facilitate access thereto for cleaning and servicing; and means for releasably securing said lower slicing mechanism in the operating position thereof.

3. A machine for slicing buns arranged in clusters each including a plurality of buns, said machine comprising:

a frame;

means on the frame for conveying the clusters of buns successively along a predetermined conveyor path;

an upper slicing mechanism mounted on the frame at a location above said conveyor path and having blade means for slicing selected buns in each cluster conveyed along said path;

a lower slicing mechanism supported on the frame at a location below said conveyor path for generally horizontal sliding movement between an operating position wherein said lower slicing mechanism underlies the conveyor path and a maintenance position wherein the lower slicing mechanism projects outwardly from the frame to facilitate access thereto for cleaning and servicing;

releasable means for securing said lower slicing mechanism in said operating position;

at least one slicing blade on said lower slicing mechanism supported thereon for rotation at a location to slice selected buns in each cluster conveyed along said path when the lower slicing mechanism is in its operating position;

power means for driving said slicing blade, said power means including a drive element for transmitting power to said slicing blade, said drive element being releasable from a power transmitting condition to allow movement of the lower slicing mechanism to the maintenance position.

4. A slicing mechanism for effecting hinge cuts in non-uniform buns, said mechanism comprising:

means for conveying the buns in side by side pairs along a conveyor path;

a plurality of guide members spaced apart to define a plurality of lanes on said conveyor path, each lane being wide enough to receive and convey a pair of the buns;

a rotary slicing blade for each lane operable to effect generally horizontal hinge cuts in each pair of buns conveyed past the blade against the guide members on opposite sides of the lane;

a pair of alignment vanes for each lane mounted at a location upstream from the slicing blade for reciprocating movement in opposite directions generally transversely of the conveyor path between a home position generally centered in the lane and an activated position wherein the vanes engage the buns in a manner to push them against the guide members on opposite sides of the lane; and power means for driving the vanes in each pair from the home position to the activated position each time a pair of the buns is conveyed into alignment with the vanes and for thereafter returning the vanes to the home position, thereby placing the buns in each pair against the guide members for slicing by the blade.

5. A machine for slicing buns arranged in clusters each having a bottom and a pair of outside buns and at least two interior buns connected with each other at a weakened area, said machine comprising:

a frame;

means on said frame for conveying the clusters of buns successively along a predetermined conveyor path;

outside slicing means mounted on said frame for effecting generally horizontal slices in the outside buns of each cluster conveyed along said path;

a disk having a dull peripheral edge portion;

means for mounting said disk on the frame for rotation about a generally horizontal axis at a location beneath said path wherein each cluster conveyed past the disk is engaged by said edge portion from the bottom near said weakened area;

means for driving said disk about said axis to effect a break along said weakened area of each cluster extending from the bottom thereof and terminating below the top of the cluster;

a slicing blade;

a shaft on which said slicing blade is mounted, said shaft being supported on the frame for rotation downstream from said disk at a location to extend into said break to situate said blade in position to effect generally horizontal slices in the interior buns of each cluster conveyed along said path;

means for rotating said shaft to rotate said slicing blade;

an upper slicing mechanism on the frame located above said conveyor path and carrying said outside slicing means;

a lower slicing mechanism carrying said disk and slicing blade;

means for mounting said lower slicing mechanism on the frame at a location below said conveyor path for generally horizontal sliding movement between an operating position wherein said lower slicing mechanism underlies the conveyor path and a maintenance position wherein the lower slicing mechanism projects outwardly from the frame to facilitate access thereto for cleaning and servicing; and means for releasably securing said lower slicing mechanism in the operating position thereof.

\* \* \* \* \*